United States Patent [19]

Chernega

[11] 4,267,238

[45] May 12, 1981

[54] FLEXIBLE MAGNETIC RECORDING MEDIA LUBRICATED WITH FLUORINATED TELECHELIC POLYETHER POLYMER

[75] Inventor: John G. Chernega, Stillwater, Minn.

[73] Assignee: Minnesota Mining and Manufacturing Company, St. Paul, Minn.

[21] Appl. No.: 100,699

[22] Filed: Dec. 18, 1979

[51] Int. Cl.$^3$ .......................... G11B 5/78; B32B 27/28
[52] U.S. Cl. ...................................... 428/422; 360/134; 358/128; 358/127; 428/480; 428/900; 428/695
[58] Field of Search .................... 428/422, 64, 480, 65, 428/900, 539; 360/134, 135; 358/128; 179/100.1 B; 252/54.6

[56] References Cited

U.S. PATENT DOCUMENTS

| | | | |
|---|---|---|---|
| 2,654,681 | 10/1953 | Lueck | 428/447 |
| 2,804,401 | 8/1957 | Cousino | 428/900 |
| 3,250,808 | 5/1966 | Moore | 562/586 |
| 3,490,946 | 11/1970 | Wolff | 428/900 |
| 3,668,658 | 6/1972 | Flores | 360/133 |
| 3,699,145 | 10/1972 | Sianesi | 562/586 |
| 3,778,308 | 12/1973 | Roller | 428/900 |
| 3,810,874 | 5/1974 | Mitsch | 528/44 |
| 3,919,719 | 11/1975 | Wright | 428/900 |
| 3,954,637 | 5/1976 | Pardee | 252/12 |
| 3,973,072 | 8/1976 | Anderson | 428/433 |
| 4,012,551 | 3/1977 | Bogaty | 428/422 |
| 4,085,137 | 4/1978 | Mitsch | 260/307 D |
| 4,096,079 | 6/1978 | Pardee | 428/64 |
| 4,097,388 | 6/1978 | Snyder | 252/49.9 |

*Primary Examiner*—Ellis P. Robinson

[57] ABSTRACT

Flexible magnetic recording tape is lubricated by a thin coating of a fluorinated telechelic polyether polymer having at least one polar group such as —CONHCH$_2$C-H$_2$OH, —COOCH$_3$, —CH$_2$OH, and —COCF$_3$. This is believed to provide for the first time reliably effective lubrication at 40° C. and 80% relative humidity.

7 Claims, No Drawings

FLEXIBLE MAGNETIC RECORDING MEDIA LUBRICATED WITH FLUORINATED TELECHELIC POLYETHER POLYMER

CROSS-REFERENCE TO RELATED APPLICATION

U.S. Application Ser. No. 1,446, filed Jan. 8, 1979 (Pedrotty) claims one or a stack of rigid magnetic recording disks coated with fluorinated polymer lubricants which are the same as those of the present invention. Applicant and Mr. Pedrotty made their inventions in the same laboratory, and applicant is advised that Mr. Pedrotty made his invention first. However, applicant made the present invention before he became aware of Mr. Pedrotty's invention.

Prior to these inventions, rigid magnetic recording disks and flexible magnetic recording media such as tape employed totally different types of lubricants.

FIELD OF THE INVENTION

The invention concerns the lubrication of flexible magnetic recording media such as tapes and cards.

BACKGROUND OF THE INVENTION

It has been known since the advent of magnetic recording tapes that their recording surfaces should be lubricated to permit sliding contact with recording heads and to inhibit adjacent convolutions of wound tape from sticking to each other after prolonged storage. The first lubricants were fatty acids and esters such as carnauba wax. These were either added to the dispersion of the magnetizable particles and binder resin or coated over the finished recording surface. The fatty acid/ester lubricants were considered to be satisfactory at ordinary ambient conditions but were not reliable at high temperatures and relative humidity, e.g., 40° C and 80% relative humidity. Also, minor variations in the use of the lubricants, such as variations in coating weights, can destroy their utility.

Very early in the development of magnetic recording tape, it was suggested that silicones might provide better lubrication at high ambient temperatures and relative humidity. See U.S. Pat. No. 2,654,681 (Lueck). Because of their higher cost and questionable superiority, only about 25 percent of current flexible magnetic recording media employ silicone lubricants while about 70 percent have fatty acid/ester lubrication. A very small percentage of flexible magnetic recording media is lubricated with graphite, especially in endless-loop tape cartridges. See U.S. Pat. No. 2,804,401 (Cousino).

U.S. Pat. No. 3,490,946 (Wolff) suggests the use of fluorocarbon compounds as lubricants for flexible magnetic recording tapes, either applied as a surface layer or dispersed into the mixture of binder and magnetizable particles. U.S. Pat. No. 3,778,308 (Roller et al.) more specifically suggests perfluoroalkyl polyethers as lubricant coatings for magnetic recording media. U.S. Pat. No. 3,919,719 (Wright et al.) provides further information concerning the use of fluorinated polymers disclosed in U.S. Pat. No. 3,778,308.

U.S. Pat. No. 3,954,637 (Pardee et al.) prepares a surface lubricant for magnetic recording tape from a dispersion in trifluorotrichloroethane of (a) a copolymer of trifluoroethylene and vinyl chloride and (b) a telomer of tetrafluoroethylene. This is then filtered to remove undissolved polymeric solids to provide a solution from which the lubricant is applied, U.S. Pat. No. 4,096,079 (Pardee) concerns the lubrication of phonograph records without mentioning magnetic recording media. A phonograph record is coated with essentially the same solution as the coating solution of U.S. Pat. No. 3,954,637 except for omission of the chlorinated copolymer (a). The average molecular weight of the fraction of the telomer (b) after the filtering is between 400 and 900.

While it is believed that no magnetic recording tape now on the market employs a fluorinated lubricant, one manufacturer uses such a lubricant for the flexible magnetic recording disk of a diskette of the type shown in U.S. Pat. No. 3,668,658 (Flores et al.).

OTHER PRIOR ART

Highly fluorinated polyether polymers have been provided with terminal polar groups which can react with other polyfunctional molecules to form polyurethanes, polyesters, polysiloxanes, polyamides or the like as disclosed in U.S. Pat. Nos. 3,810,874 and 4,085,137 (Mitsch et al.). The latter at column 11, lines 42–49 teaches that said polymers containing terminal polar groups are also useful as lubricants, but without illustrating that use. U.S. Pat. No. 4,097,388 (Snyder et al.) uses the same fluorinated prepolymers, except with different terminal polar groups, as lubricants for engine oils, hydraulic fluids, and greases.

THE PRESENT INVENTION

The present invention concerns a magnetic recording medium comprising a flexible backing and a magnetizable layer which has a lubricating coating that reliably provides effective lubrication at 40° C. annd 80% relative humidity. Surprisingly great latitude in the weight or thickness of the lubricating coating can be tolerated without interfering with the novel achievement. That lubricating coating comprises a fluorinated telechelic polyether polymer having a backbone comprising $-C_aF_{2a}-O-$ units wherein a is an integer from 1 to 4, which backbone is terminated by at least one polar group such that $\mu^2/MW$ is at least $19 \times 10^{-4}$ Debye$^2$-moles/g. "Telechelic" polymers have low molecular weight and known functional terminal groups.

The dipole momemt $\mu$ of the fluorinated telechelic polymer can be calculated from the Onsager Relation $$\mu^2 = \frac{9k\ TMW\ (\epsilon_s - \epsilon_\infty)\ (2\epsilon_s + \epsilon_\infty)}{4\pi\ N_o d\ \epsilon_s (\epsilon_\infty + 2)^2}$$

where
  k = Boltzmann's Constant
  T = Temperature in °K
  MW = Molecular Weight
  $N_o$ = Avogadro's Number
  d = Density
  $\epsilon_s$ = Dielectric constant measured at low frequencies,
  $\epsilon_\infty$ = Dielectric constant measured at high frequencies, where the approximation is made through Maxwell's Relations that $$\epsilon_\infty = \eta_D^2 + (5-10\%)\eta_D^2 \simeq 1.075\ \eta_D^2$$

where $\eta_D$ is the refractive index of the material at the sodium D line at 20° C. The fluorinated telechelic polyether polymer preferably has a number average molecular weight of at least 1000 and a Ferranti-Shirley viscosity (measured at 1640 sec$^{-1}$ and 20° C.) of at least 20 centipoise. The number average molecular weight of fluorinated telechelic polyether polymers having more than one terminal polar group per polymer molecule is preferably somewhat higher as compared to telechelic polymers having only one terminal polar group. For example, where there are two terminal polar groups per polymer molecule, the number average molecular weight preferably exceeds 1500.

Useful polar groups for the fluorinated telechelic polyethers include

—$CO_2R$ wherein R is alkyl of 1 to 6 carbon atoms, aryl or alkaryl of 6 to 10 carbon atoms;

wherein each of R' and R" is hydrogen, alkyl of 1 to 6 carbon atoms, benzyl, or —R''' OH where R''' is an alkylene group of 2 to 6 carbon atoms;
—$C_bH_{2b}OH$;
—$C_bH_{2b}NR'R''$;

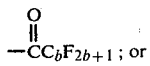

—$C(OH)_2C_bF_{2b+1}$ wherein b is an integer of 1 to 4. Strongly acidic polar groups such as carboxylic or sulfonic acid groups are less desirable because they are potentially corrosive. This may be minimized by conversion to salts. Preferably the pKa of the telechelic polyether polymer is at least 1.0.

Preferred fluorinated telechelic polymers have the backbone—$[CF_2CF_2O]_m$—$]CF_2O]n$—, where m is an integer from about 6 to 32 and n is an integer from about 12 to 52, as disclosed in U.S. Pat. Nos. 3,810,874 and 4,085,137, or the backbone $\{CF(CF_3)CF_2O\}_n$ or $\{CF_2CF(CF_3)O\}_n$, where n is an integer from about 6 to 20, as disclosed in U.S. Pat. Nos. 3,250,808 and 3,699,145.

Such fluorinated telechelic polyethers are readily produced to have number average molecular weights within the preferred range of 1000–5000 and Ferranti-Shirley viscosities (measured at $1640^{-1}$ sec) within the preferred range of 20–2000 centipoise. The fluorinated telechelic polyether polymer may also contain —$CF_2$—$CF_2$— units which increase the separation between the ether oxygens and tend to make it necessary to avoid number average molecular weights toward the high end of the preferred range of 1000–5000 mentioned above. Otherwise, the viscosity of the fluorinated telechelic polyether polymer might be too high to provide good lubrication.

Superior lubrication has been attained by applying the fluorinated telechelic polyether polymer with a rotogravure coater from solutions or emulsions as dilute as 0.1% by weight, thus producing what is believed to be a coating weight of about 10 mg/m². Such a coating is approximately of monomolecular thickness. There has been no testing to assure that a coating of that thickness could continue to provide effective lubrication for a period of years. The actual coating weights are so small as to be difficult to measure, but superior lubrication has been achieved at coating weights which are believed to be about 10 to 150 mg/m². It is currently preferred to apply the fluorinated telechelic polymer from a 0.4–0.8% solution or emulsion to provide coating weights of about 25–60 mg/m². This should provide reasonable assurance of good lubricating properties under adverse environmental conditions for a number of years.

It may be desirable to blend the fluorinated telechelic polyether polymer with other lubricants such as fatty acids and esters to provide reliable stop-motion in video tape recorders at high temperatures and high relative humidity. The fluorinated telechelic polyether polymer should comprise at least 10% by weight of the blended lubricants. Preferably the coating weight of the blended lubricants is from 25 to 150 mg/m².

The backing member of each of the magnetic recording media of the following examples was a flexible biaxially-oriented polyethylene terephthalate film having a thickness with the approximate range of 15 micrometers.

EXAMPLE 1

A preferred fluorinated telechelic polyether polymer of the invention is

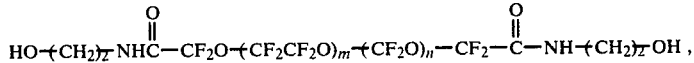

where m and n are each integers providing an average molecular weight of about 2000, and has a Ferranti-Shirley viscosity of 1440 cps. 0.3 g of this telechelic polyether was emulsified in 60 g of isopropyl alcohol, and the emulsion was applied with a rotogravure coater over the recording layer of a flexible magnetizable recording tape. The recording layer comprised fine acicular magnetizable iron oxide particles in a binder comprising crosslinked polyvinyl chloride copolymer and polyester polyurethane. The recording layer was specifically designed for helical-scan video recording except that it contained no lubricant.

After the telechelic polymer coating was dried in an oven at about 50° C. to a dried coating weight of about 37.5 mg/m², the coated tape was slit to one-half-inch (1.27-cm) widths and then loaded into videocassettes of the "VHS" and "Betamax" formats. Two videocassettes of the Betamax format and one of the VHS format were tested on videorecorders at 40° C. and 80% relative humidity through 500 cycles, at which point the tests were terminated. None of the tapes had failed. Current industry standards require 200 passes without failure. Both of the Betamax cassettes were further tested to 1000 cycles, again with no failures. One Betamax cassette was tested to 1500 cycles, and its tape did not fail.

EXAMPLES 1A and 1B

Two Betamax videocassette tapes were prepared which were identical to those of Example 1 except having twice and half the coating weight, respectively. Each also passed 500 cycles at 40° C. and 80% relative humidity without failure.

EXAMPLE 1C

The same fluorinated telechelic polymer was coated over the recording layer of each of several endless-loop, 8-track audio recording tapes, the recording layers of which comprised acicular iron oxide particles in non-magnetizable binder. At least 5-fold improvement was noted in resistance to wear at ordinary room temperature and 50% relative humidity as compared to typical endless-loop, 8-track audio recording tapes now on the market.

EXAMPLES 1D and 1E

Two Betamax videocassette tapes were prepared which were identical to those of Example 1 except that one lubricating coating contained 2.5 parts by weight of butyl myristate and the other, 2 parts by weight of myristic acid per part of the telechelic polymer. When tested at 40° C. and 80% relative humidity, the first tape passed 200 cycles and the second passed 500 cycles without failure, whereupon testing was discontinued.

The following telechelic fluorinated polyether polymers were tested as lubricants for the same magnetic recording tape as in Example 1 except that the test results are here reported only for Betamax videocassettes.

| Example No. | Polymer | No.ave. MW | Viscosity (Fer-Sh) Cps. |
|---|---|---|---|
| 2 | $CH_3OC(=O)-CF_2O-(CF_2CF_2O)_m-(CF_2O)_n-CF_2-COCH_3(=O)$ | 3500 | 54 |
| 3 | $HO-CH_2-CF_2O-(CF_2CF_2O)_m-(CF_2O)_n-CF_2-CH_2OH$ | 2000 | 24 |
| 4 | " | 4000 | 194 |
| 5 | $CF_3-O-(CF_2-CF(CF_3)-O)_nCF_2-C(=O)-CF_3$ (see U.S. Pat. No. 3,683,027) | 2600 | 125 |
| 6 | $F(CF(CF_3)-CF_2-O)_n-CF(CF_3)-COOH$ (obtained as "Krytox" 157) | 3200 | 1130 |
| 7 | $F(CF(CF_3)-CF_2-O)_n-CF(CF_3)-CO_2CH_3$ | 3200 | 345 |
| 8 | $F(CF(CF_3)-CF_2O)_n-CF(CF_3)-C(=O)-NH(CH_2)_2OH$ | 3300 | 1785 |
| Comparative Example No. | | | |
| A | $CF_3-O-(CF_2CF(CF_3)-O)_n-CF_2CF_2CF_3$ (obtained as "Fomblin" PPO-Y) | 3600 | 708 |
| B | $F(CF(CF_3)-CF_2-O)_n-C_2F_5$ (obtained as "Krytox" 143 AZ) | 1300 | 77 |

The fluorinated polymers of Example 1–8 and Comparative Examples A and B had the following values ($\epsilon_s$ being measured at 100 Hz, except Example 1 at 10,000 Hz and Example 8 at 1000 Hz):

| Example | m | n | d | $\epsilon_s$ | $\epsilon_\infty$ | $\mu^2/MW \times 10^4$ |
|---|---|---|---|---|---|---|
| 1 | 8 | 14 | 1.772 | 23.0 | 1.876 | 809 |
| 2 | 16 | 28 | 1.750 | 2.86 | 1.805 | 53.7 |
| 3 | 8 | 14 | 1.793 | 2.80 | 1.809 | 49.4 |
| 4 | 16 | 28 | 1.814 | 2.55 | 1.805 | 37.6 |
| 5 | — | 15 | 1.874 | 2.22 | 1.814 | 20.6 |
| 6 | — | 18 | 1.80 | 2.36 | 1.825 | 27.6 |
| 7 | — | 18 | 1.848 | 2.79 | 1.822 | 46.6 |
| 8 | — | 18 | 1.90 | 3.68 | 1.843 | 80.2 |
| A | — | 20 | 1.886 | 2.14 | 1.816 | 16.7 |
| B | — | 10 | 1.860 | 2.15 | 1.797 | 18.2 |

Each test of a tape of Examples 2–8 and Comparative Examples A and B was continued until failure or 500 cycles without failure at 40° C. and the indicated relative humidity. Each test was discontinued immediately after any failure such as jamming of the tape, visual scoring of its magnetizable layer, accumulations of visible residue on the video heads, a 6 dB loss in video signal, or sticking of the tape to the video capstan, audio stack or to any other surface. Results are summarized below:

| Example | Concentration | Vehicle | Relative Humidity | No. of Passes |
|---|---|---|---|---|
| 2 | 1% | IPA | 85% | 500+ |
|  | 0.5% | " | " | 452 |
| 3 | 1% | " | 80% | 500+ (2 tapes) |
|  | 0.25% | Freon | " | 500+ |
| 4 | 1% | IPA | 85% | 119 |
|  | " | " | " | 30 |
|  | " | " | " | 500+ |
| 5 | " | Freon | 80% | 500+ (2 tapes) |
|  | " | IPA | " | 500+ (2 tapes) |
|  | 0.5% | " | " | 71 |
| 6 | " | " | " | 500+ |
| 7 | 1% | " | " | " |
|  | 0.5% | " | " | " |
| 8 | 1% | " | " | 500+ |
|  | " | " | " | 40 |

-continued

| Example | Polymer Concentration | Vehicle | Relative Humidity | No. of Passes |
|---|---|---|---|---|
| A | 0.5% | " | " | 5 |
|  | " | " | " | 481 |
|  | 1% | " | " | 124 |
|  | " | " | 85% | 15 |
| B | 0.5% | " | " | 29 |
|  | 1% | " | 50%* | 383 |
|  | 0.5% | " | 50%* | 212 |

*tested at 20° C.
500+ indicates no failure at 500 cycles
IPA = isopropyl alcohol
Freon = CClF$_2$CCl$_2$F sold as "Freon" 113

I claim:

1. Magnetic recording medium comprising a flexible backing and magnetizable layer, said layer having a lubricating coating comprising a fluorinated telechelic polyether polymer having a backbone comprising —C$_a$F$_{2a}$—O—units wherein a is an integer from 1 to 4, which backbone is terminated by at least one polar group, the $\mu^2$/MW of the polymer being at least $19 \times 10^{-4}$ Debye$^2$-moles/g, which lubricating coating reliably provides effective lubrication at 40° C. and 80% relative humidity.

2. Magnetic recording medium as defined in claim 1, wherein at least one polar end group is selected from —CO$_2$R wherein R is alkyl of 1 to 6 carbon atoms, aryl or alkaryl of 6 to 10 carbon atoms;

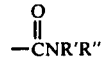

wherein each of R' and R" is hydrogen, alkyl of 1 to 6 carbon atoms, benzyl, or —R'" OH where R'" is an alkylene group of 2 to 6 carbon atoms;

—C$_b$H$_{2b}$OH;

—C$_b$H$_{2b}$NR'R" ;

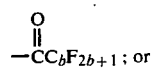

—C(OH)$_2$C$_b$F$_{2b+1}$ wherein b is an integer of 1 to 4.

3. Magnetic recording medium as defined in claim 2, wherein said telechelic polymer is selected from

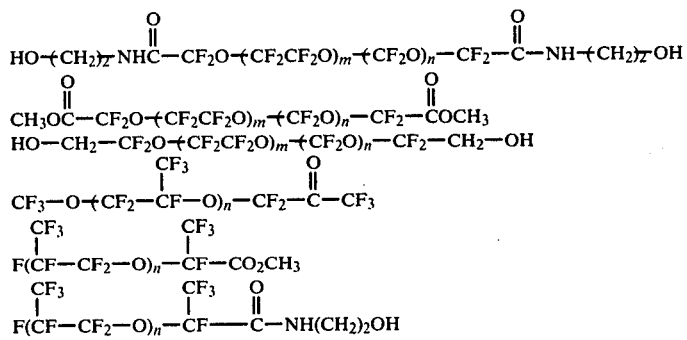

and m and n are each integers.

4. Magnetic recording medium as defined in claim 1, wherein the Ferranti-Shirley viscosity of said telechelic polymer is at least 20 centipoise.

5. Magnetic recording medium as defined in claim 4, wherein the Ferranti-Shirley viscosity of said telechelic polymer is at most 2000 centipoise.

6. Magnetic recording medium as defined in claim 1, wherein said telechelic polymer has a number average molecular weight of at least 1000.

7. Magnetic recording medium as defined in claim 1, wherein up to 90% by weight of said lubricating coating comprises a fatty acid or ester and has a coating weight of 25-150 mg/m$^2$.

* * * * *